US012694763B2

(12) United States Patent
Johnson et al.

(10) Patent No.: US 12,694,763 B2
(45) Date of Patent: Jul. 28, 2026

(54) SELF-CHECKOUT SYSTEM WITH READINESS AWARENESS

(71) Applicant: TOSHIBA GLOBAL COMMERCE SOLUTIONS, INC., Durham, NC (US)

(72) Inventors: Brad M. Johnson, Raleigh, NC (US); William L. Dungan, Cary, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 0 days.

(21) Appl. No.: 18/975,966

(22) Filed: Dec. 10, 2024

(65) Prior Publication Data

US 2026/0162507 A1     Jun. 11, 2026

(51) Int. Cl.
G07G 1/01          (2006.01)
G06V 20/52         (2022.01)
G07G 1/00          (2006.01)

(52) U.S. Cl.
CPC ............... G07G 1/01 (2013.01); G06V 20/52 (2022.01); G07G 1/0018 (2013.01)

(58) Field of Classification Search
CPC .... G06V 40/1365; G06V 20/52; G06V 20/90; G06V 20/50; G06V 20/64; G07G 1/01; G07G 3/00; G07G 3/003; G07G 3/006; G07G 1/0009; G07G 1/0036; G06Q 30/0238; G06Q 30/0268; G06Q 20/20
See application file for complete search history.

(56) References Cited

U.S. PATENT DOCUMENTS

| | | | |
|---|---|---|---|
| 2016/0071385 A1* | 3/2016 | Chave | ............... G08B 13/2402 |
| | | | 340/572.1 |
| 2017/0228713 A1* | 8/2017 | Nichols | ............. G06Q 20/4016 |
| 2021/0125166 A1* | 4/2021 | Tsirulnik | ............. G07G 1/0063 |

FOREIGN PATENT DOCUMENTS

| | | | | |
|---|---|---|---|---|
| EP | 2058776 A2 * | 5/2009 | .......... | G07G 1/0018 |
| EP | 3619693 B1 * | 8/2025 | .............. | G07G 1/14 |

OTHER PUBLICATIONS

Design and evaluation of a six-component load cell (Year: 2002).*
New Automated Checkout Systems (Year: 2009).*

* cited by examiner

*Primary Examiner* — Thien T Mai
(74) *Attorney, Agent, or Firm* — Patterson + Sheridan, LLP; Gero G. McClellan

(57) ABSTRACT

A self-checkout system is provided. In one aspect, a self-checkout system includes a housing having a base support, a tower extending vertically upwards from the base support, and a back panel extending vertically upwards relative to the tower. Further, the self-checkout system includes a display screen mounted to the back panel, an input shelf and an output shelf each mounted to the tower, and a computing system configured to receive data indicating that an impact force has been applied to the self-checkout system; determine whether the self-checkout system has experienced an impact event based at least in part on the data; and perform a control action in response to determining that the self-checkout system has experienced the impact event.

18 Claims, 5 Drawing Sheets

200

RECEIVE DATA INDICATING THAT AN IMPACT FORCE HAS BEEN APPLIED TO THE SELF-CHECKOUT SYSTEM — 202

DETERMINE WHETHER THE SELF-CHECKOUT SYSTEM HAS EXPERIENCED AN IMPACT EVENT BASED AT LEAST IN PART ON THE DATA — 204

PERFORM A CONTROL ACTION IN RESPONSE TO DETERMINING THAT THE SELF-CHECKOUT SYSTEM HAS EXPERIENCED AN IMPACT EVENT — 206

300

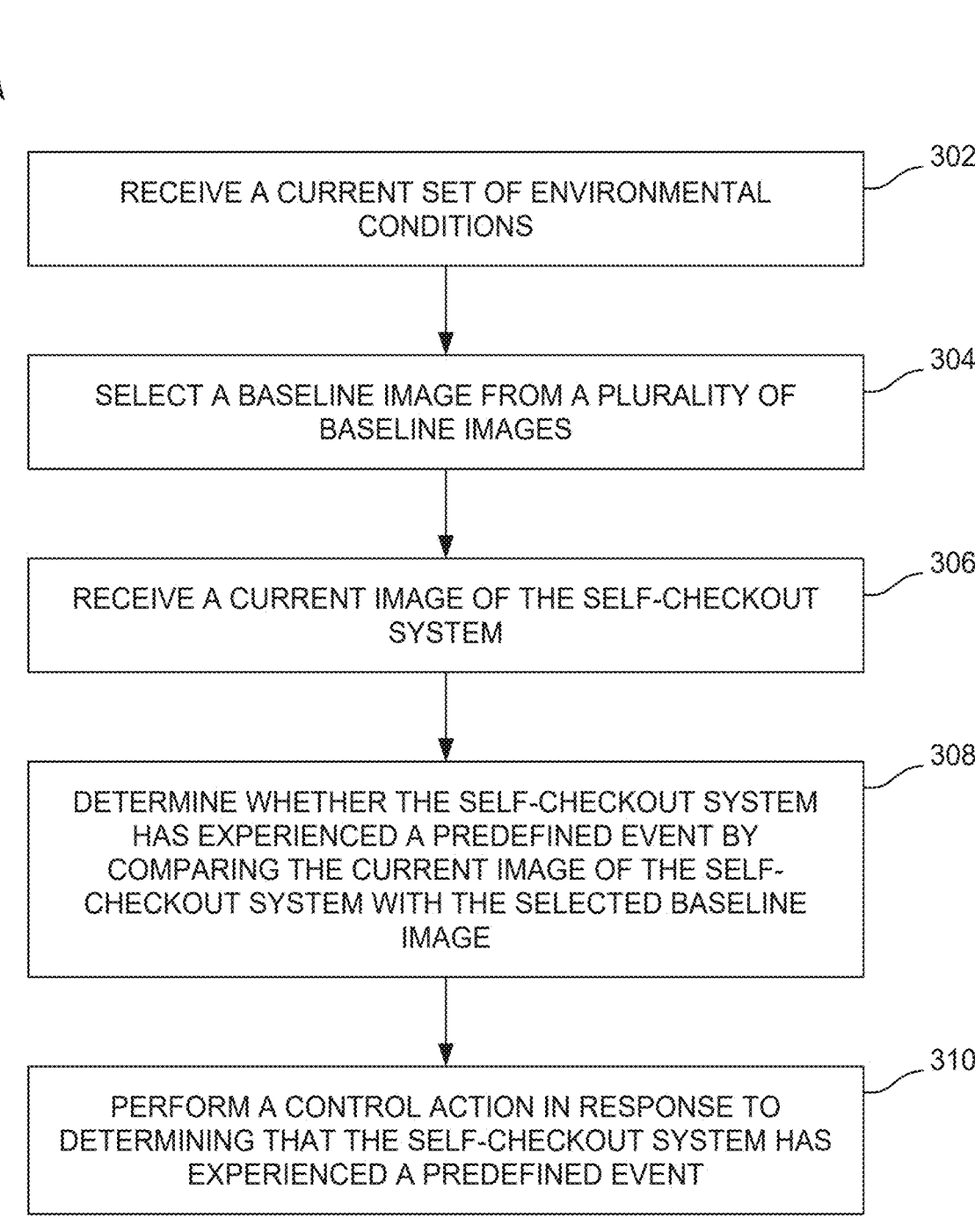

302
RECEIVE A CURRENT SET OF ENVIRONMENTAL
CONDITIONS

304
SELECT A BASELINE IMAGE FROM A PLURALITY OF
BASELINE IMAGES

306
RECEIVE A CURRENT IMAGE OF THE SELF-CHECKOUT
SYSTEM

308
DETERMINE WHETHER THE SELF-CHECKOUT SYSTEM
HAS EXPERIENCED A PREDEFINED EVENT BY
COMPARING THE CURRENT IMAGE OF THE SELF-
CHECKOUT SYSTEM WITH THE SELECTED BASELINE
IMAGE

310
PERFORM A CONTROL ACTION IN RESPONSE TO
DETERMINING THAT THE SELF-CHECKOUT SYSTEM HAS
EXPERIENCED A PREDEFINED EVENT

FIG. 6

SELF-CHECKOUT SYSTEM WITH READINESS AWARENESS

BACKGROUND

Many retail stores offer buyers the option to purchase items at self-service kiosks. Self-service kiosks have become desirable to both buyers and retailers. For buyers, the kiosks offer reduced wait times as compared to using a cashier lane. Retailers can benefit from increased checkout efficiency. During a checkout transaction, a buyer can scan product barcodes for each product and can place them on a platform to be weighed and/or monitored during the transaction. A display screen can provide helpful information to the buyer, such as the cost of the items scanned, whether an item is on sale or discounted, a weight of an item, etc. In some instances, a kiosk can be impacted by an event that can cause the kiosk to operate less than optimally.

BRIEF DESCRIPTION OF THE DRAWINGS

FIG. 6 is a flow diagram for implementing a system readiness check operation for detecting, classifying, and addressing predefined events associated with a self-checkout system, according to one or more aspects of the present disclosure.

DETAILED DESCRIPTION

Figure 1:
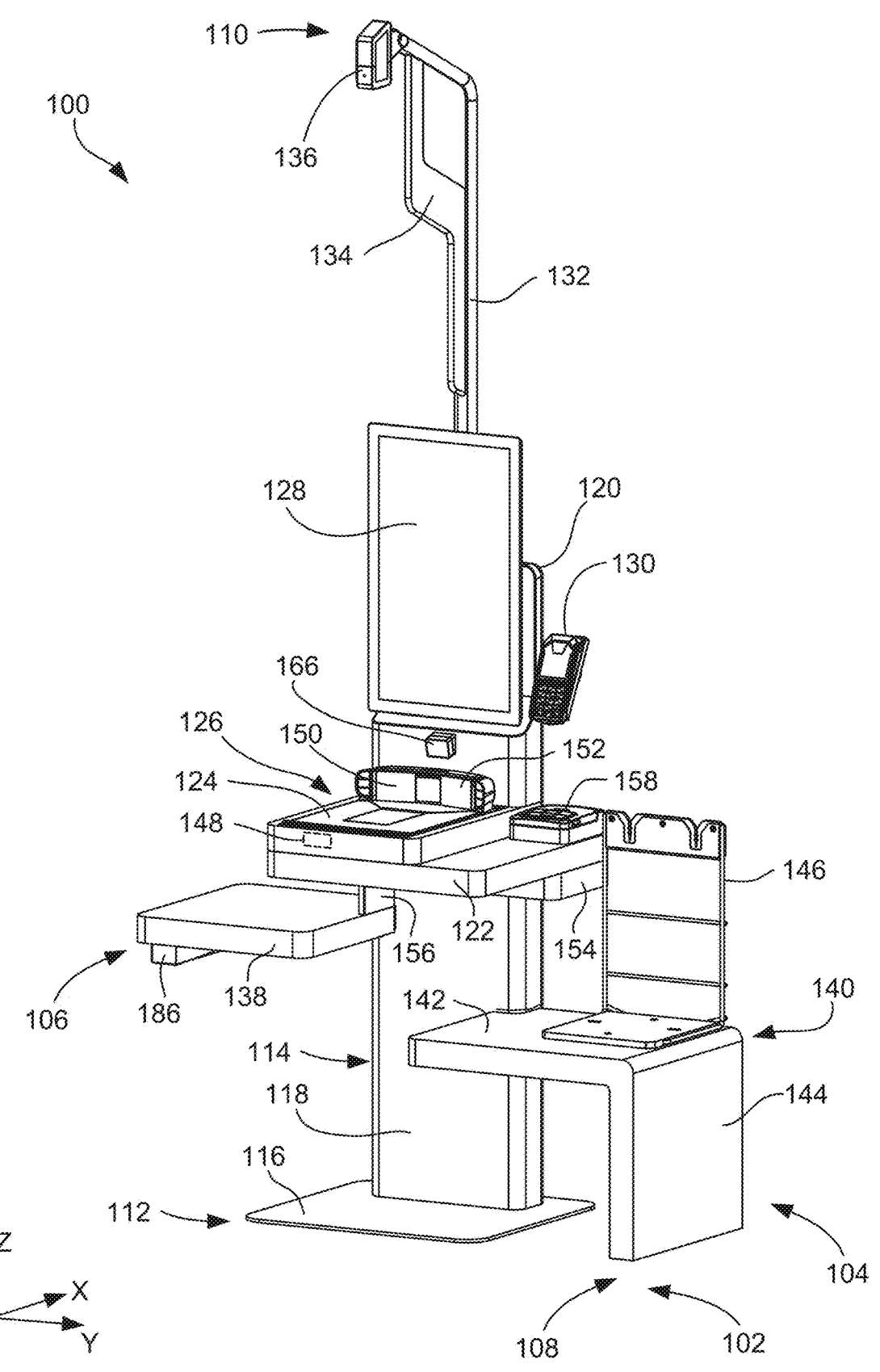
FIG. 1 depicts a perspective view of a self-checkout system, according to one or more aspects of the present disclosure.

A self-checkout system can experience an impact event that can cause the system to operate less than optimally. As one example, a shopping cart full of groceries can strike a tower or one of the shelves of the self-checkout system. Such an impact event can lead to one or more of the load cells of an item scanner or scale to lose accuracy, which can affect the weight measurements of scanned items. Moreover, a field of view of one or more cameras of a self-checkout system may be shifted out of range, and consequently, items may not be scanned properly or blind spots can be created, which may affect the ability of the self-checkout system to perform loss prevention techniques.

Self-checkout systems disclosed herein can include features for detecting and addressing such impact events. In one or more examples, a self-checkout system can have a housing that includes a base support, a tower extending vertically upwards from the base support, and a back panel extending vertically upwards from the tower. A display screen can be mounted to the back panel. An input shelf and an output shelf can each be mounted to the tower. In this regard, the self-checkout system can have a tower-based architecture, without a cabinet, that may be prone to impact strikes by shopping carts and other items. The self-checkout system can include a computing system arranged to execute a system readiness scheme to detect and address impact events. In one example, the computing system is configured to receive data indicating that an impact force has been applied to the self-checkout system. As one example, a shopping cart can strike the tower or one of the shelves, and at least a magnitude of this impact force can be captured. The computing system can be further configured to determine whether the self-checkout system has experienced an impact event based at least in part on the data. As one example, the impact force can be compared to a force threshold to determine whether the impact force rises to a level of an impact event. The computing system can also be configured to perform a control action in response to determining that the self-checkout system has experienced the impact event. Example control actions can include, without limitation, shutting down the lane with a lane blocker, communicating the event to an operator (e.g., a sales associate), changing the mode of the self-checkout system from a normal mode to a stand-by mode or a shutdown mode, and automatically performing a recalibration process for one or more load cells. Thus, such a self-checkout system can detect and address impact events.

Further, self-checkout systems can experience various predefined events, such as spills on or near a self-checkout system, "left item" events in which a user leaves an item on the self-checkout system, damaged component events, etc. Self-checkout systems disclosed herein can include features for detecting, classifying, and addressing such predefined events. In one or more examples, a self-checkout system can include a computer vision system arranged to compare one or more captured images with one or more baseline images, taking into account environmental conditions that may affect the captured images. In this regard, the accuracy of the detection and classification of predefined events can be improved.

In yet a further aspect, a self-checkout system disclosed herein can include a printer embedded, at least in part, within a counter of the self-checkout system. A printer engine of the printer can be embedded within the counter while the cover can be arranged above a top surface of the counter. Embedding the printer within the counter can reduce visual noise and can reduce the probability that the printer will be struck by items, e.g., being moved from the "buy zone" to the bagger area. Moreover, embedding at least the printer engine below the counter can reduce noise emissions while the cover is still readily accessible, e.g., so that paper can be added and/or maintenance of the printer can be performed without removing the printer.

Turning now to the drawings, FIG. 1 depicts a perspective view of a self-checkout system 100, according to one or more aspects of the present disclosure. The self-checkout system 100 can also be referred to as a self-service kiosk or a checkout terminal. For reference, the self-checkout system 100 defines an X-direction, a Y-direction, and a Z-direction, which are mutually perpendicular to one another. In one or more examples, the X-direction is a transverse direction, the Y-direction is a lateral direction, and the Z-direction is a vertical direction.

The self-checkout system 100 has a front 102 and a back 104, a first side 106 and a second side 108, and a top side 110 and a bottom side 112. The self-checkout system 100 includes a housing 114 having a base support 116, a tower 118, and a back panel 120. The tower 118 is seated on, and extends vertically upwards from, the base support 116, e.g., upwards along the Z-direction. The base support 116 extends around or circumscribes the tower 118 and can be mounted, e.g., to the floor. The base support 116 is generally planar and extends in a plane, e.g., perpendicular to the Z-direction, or rather, in an XY plane.

The back panel 120 is coupled with the tower 118 and extends vertically upwards, e.g., along the Z-direction. In one or more examples, the back panel 120 can be mounted directly to the tower 118. In other examples, the back panel 120 can be mounted indirectly to the tower 118, with one or more components being arranged therebetween, such as a counter 122 mounted to the tower 118 and a platform 124 of an item scanner 126 mounted on the counter 122. The back panel 120 has a front wall and a back wall. The front wall has a vertically-oriented planar surface and a curved bottom surface that transitions the front wall between a vertical orientation and a horizontal orientation. The vertically-oriented planar surface and the curved bottom surface can be contiguous. In at least one example, the back panel 120 can be integrally formed with the tower 118 as a unitary mono-lithic component. In one or more other examples, the back panel 120 and the tower 118 can be separate components coupled together. A display screen 128 is mounted to the back panel 120. In at least one example, the display screen 128 is cantilevered from the vertically-oriented planar sur-face of the front wall by way of a mounting bracket. In one or more examples, at least a portion of the display screen 128 is arranged vertically above the back panel 120. The curved bottom surface of the front wall can curve underneath the display screen 128. In this way, the center of gravity of the self-checkout system 100 can be more centrally located. In addition, the display screen 128 can be arranged vertically above the tower 118. In at least some examples, a forward wall of the tower 118 can be arranged forward of a back side of the display screen 128, e.g., along the X-direction.

A payment terminal 130 can be mounted to a side wall of the back panel 120. The payment terminal 130 can include a display, keypad, a card reader, near field communication (NFC) beacon, etc. for facilitating payment processing dur-ing a transaction. Moreover, a lane status pole 132 can extend from a top wall of the back panel 120. The lane status pole 132 has a lane light 134 mounted thereto. The lane light 134 can be controlled to indicate a status of the self-checkout system 100, e.g., green for ready for use/open, red for closed, yellow for occupied, etc. A camera 136 is mounted to a distal end of the lane status pole 132. In at least one example, the camera 136 can be pivotably coupled with the lane status pole 132, e.g., with a hinge as shown in FIG. 1. The camera 136 can capture images of the self-checkout system 100, users, etc.

At the first side 106 of the self-checkout system 100, an input shelf 138 is mounted to the tower 118. The input shelf 138 can be mounted to a front left corner of the tower 118. The input shelf 138 can provide a place for a user to place items prior to registering or scanning items for purchase. At the second side 108 of the self-checkout system 100, an output shelf 140 is mounted to the tower 118. The output shelf 140 can be mounted to a front right corner of the tower 118. The output shelf 140 can provide a place for a user to bag items after purchase. The output shelf 140 has a hori-zontal portion 142 that curves or transitions into a vertical portion 144. In this regard, the output shelf 140 has a "waterfall" configuration. The vertical portion 144 can rest on the ground while the horizontal portion 142 can be coupled to the front right corner of the tower 118. A bagger rack 146 can be mounted to the horizontal portion 142. The bagger rack 146 can hold bags that can be used to bag purchased items. In at least one example, such as the in the example of FIG. 1, the input shelf 138 and the output shelf 140 are mounted to opposing corners of the tower 118.

As further shown in FIG. 1, the counter 122 is mounted to the tower 118, e.g., at a front side thereof. The item scanner 126 is disposed on the counter 122. The item scanner 126 is communicatively coupled with the one or more processors, and in conjunction with the one or more processors, can visually identify items during scanning. For example, the item scanner 126 can detect encoded portions (e.g., a universal product code (UPC) or a quick response (QR) code) and/or may compare imagery of the item with reference image(s) to identify an item type of the item. In at least some examples, the item scanner 126 can include one or more load cells 148 arranged with the platform 124 for measuring the weight of items. The item scanner 126 can include cameras 150, 152 that can be used to capture images. In at least some examples, such as in FIG. 1 and shown in the close-up cross-sectional view of FIG. 3, the counter 122 can be seated on a top side of the tower 118 and the platform 124 of the item scanner 126 can be seated on a top side of the counter 122. The back panel 120 can then be attached to the platform 124 of the item scanner 126. In other examples, the item scanner 126 can be omitted such that the back panel 120 is seated on the counter 122. In further examples, the back panel 120 can be seated directly on the top side of the tower 118.

A counter support 154 is arranged beneath the counter 122 to provide support thereto. The counter support 154 is also mounted to the tower 118. A vertical support member 156 is positioned to couple the input shelf 138 and the counter support 154. The vertical support member 156 extends between and connects the top surface of the input shelf 138 with a bottom surface of the counter 122. The vertical support member 156 can provide support to the input shelf 138.

Figure 2:
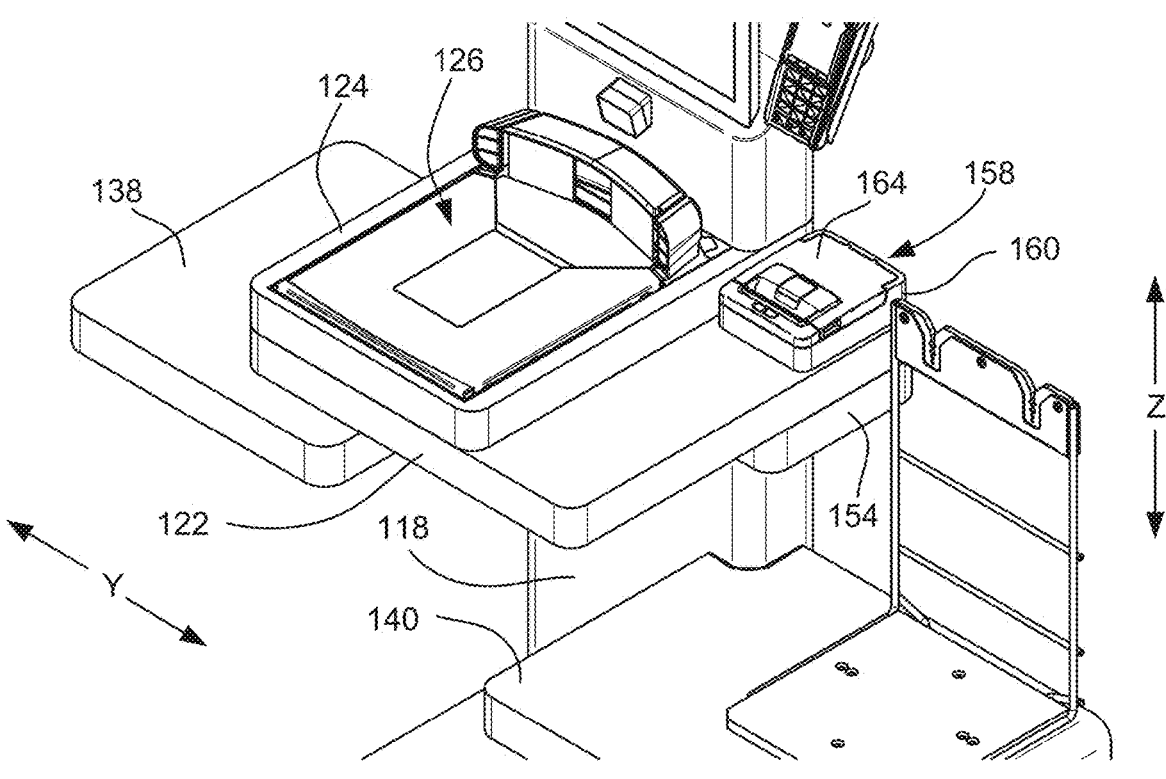
FIG. 2 depicts a close-up perspective view of the self-checkout system of FIG. 1.
Figure 3:
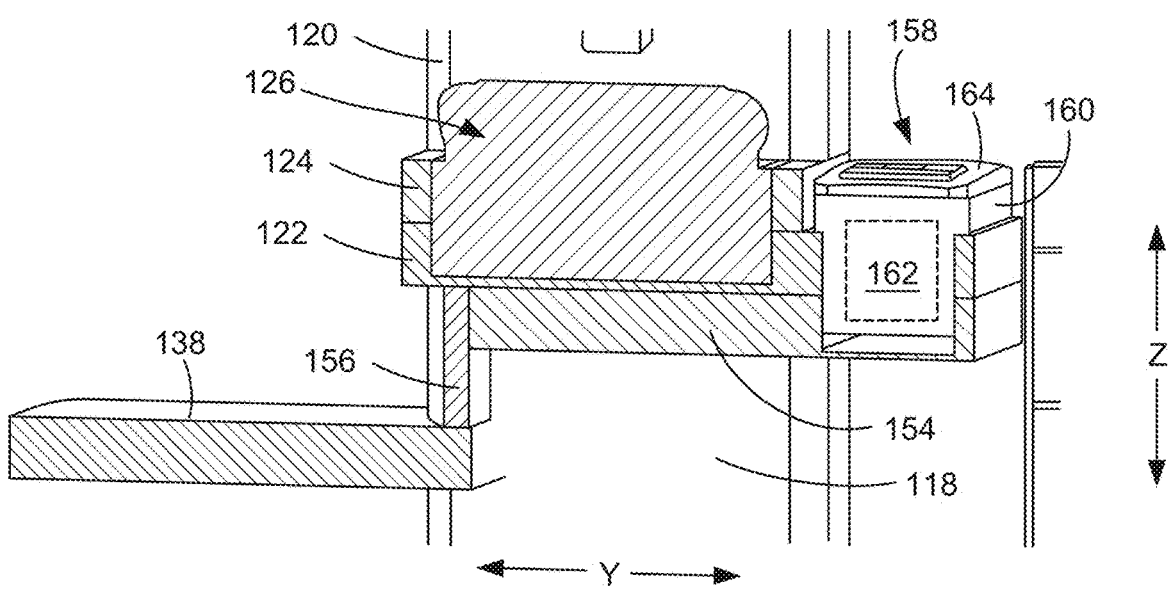
FIG. 3 depicts a close-up cross-sectional view of the self-checkout system of FIG. 1.

With reference now to FIGS. 1, 2, and 3, the self-checkout system 100 includes a printer 158. The printer 158 has a printer housing 160, a printer engine 162 disposed in the printer housing 160, and a cover 164 providing selective access to the printer engine 162 within the printer housing 160. The printer housing 160 and the printer engine 162 are embedded, at least in part, within the counter support 154 and the counter 122. Moreover, the cover 164 is arranged above a top surface of the counter 122. Embedding the printer 158 within the counter 122 can reduce visual noise and can reduce the probability that the printer 158 will be struck by items, e.g., being moved from the "buy zone" proximate the item scanner 126 to the bagger area. More-over, embedding at least the printer engine 162 below the counter 122 can reduce noise emissions while the cover 164 is still readily accessible, e.g., so that paper can be added and/or maintenance of the printer 158 can be performed without removing the printer 158 from the counter 122.

In one or more examples, a camera 166 can be arranged above the item scanner 126 and can be mounted to forward wall of the tower 118. The camera 166 can be arranged to capture images of items placed in the "buy zone" or in the general area of the item scanner 126. The camera 166 can also be used to capture images of a user present at the self-checkout system 100, e.g., for capturing biometric data.

Figure 4:
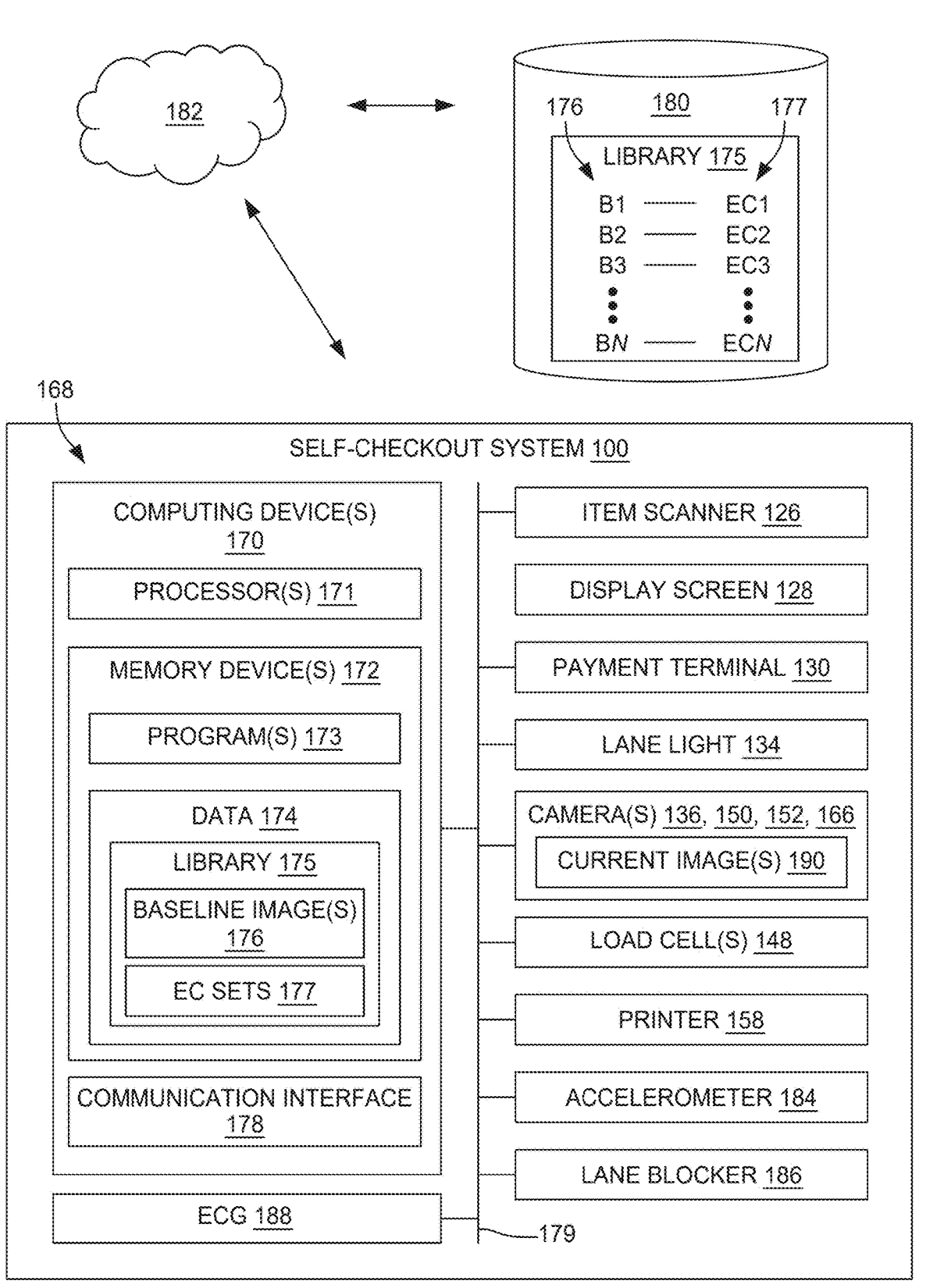
FIG. 4 is a block diagram of the self-checkout system of FIG. 1.

FIG. 4 is a schematic representation of the self-checkout system 100. As illustrated in FIG. 4, the self-checkout system 100 can include a computing system 168. The computing system 168 can include one or more computing devices, such as computing device 170. The computing device 170 can include one or more processors 171 and one or more memory devices 172 storing one or more programs 173, which, when executed by any combination of the one or more processors 171, causes the one or more processors 171 to perform an operation, such as implementing a system readiness operation or system readiness check. The one or more memory devices 172 can also store data 174. The data 174 can include, among other things, a library 175. The library 175 can correspond baseline images 176 with pre-defined sets of environmental conditions 177 (or EC sets 177 in FIG. 4).

In some examples, the library 175 can be stored locally on the computing device 170, e.g., in one or more non-transitory memory devices 172 thereof. In other embodiments, the library 175 can be stored offboard the self-checkout system 100, e.g., on a data store 180 as shown in FIG. 4. The computing device 170 can access the library 175 over a network 182, such as the internet. The computing device 170 can include a communication interface 178 that enables communication with over devices over the network 182 and also locally with other devices of the self-checkout system 100 via a communication bus 179. The communication interface 178 can include transmitter circuitry configured to send communication signals and receiver circuitry configured to receive communication signals. In this regard, the communication interface 178 can include transmitters, receivers, transceivers, etc. for communication over the network 182 and/or the communication bus 179. In yet other embodiments, the library 175 can be stored in part locally and in part remotely.

The computing device 170 is communicatively coupled with other devices/components of the self-checkout system 100 by way the communication bus 179, e.g., by one or more wired and/or wireless communication links. As depicted in FIG. 4, the computing device 170 can be communicatively coupled with the item scanner 126, the display screen 128, the payment terminal 130, the lane light 134, the cameras 136, 150, 152, 166, the load cells 148, the printer 158, an accelerometer 184 (which can be embedded within the display screen 128), a lane blocker 186, and an environmental conditions generator 188 (or ECG 188 in FIG. 4). The computing device 170 can be located in any suitable location, such as behind the display screen 128. The computing device 170 can also be communicatively coupled with other devices, such as one or more speakers, user input devices, other light sources, offboard devices (such as off-board cameras, computing devices, sensors, etc.).

System Readiness—Impact Events

In one or more examples, the self-checkout system 100 can be arranged to implement a system readiness scheme in response to being struck by an impact force, such as by a shopping cart running into the tower 118 or one of the shelves of the self-checkout system 100. In some cases, an impact force applied to the self-checkout system 100 can lead to the self-checkout system 100 experiencing an impact event, which may cause the self-checkout system 100 to perform less than optimally. For instance, impact events can lead to one or more of the load cells 148 of the item scanner 126 losing accuracy, which can affect the weight measurements of scanned items. Moreover, a field of view of one or more cameras may be shifted out of range, and consequently, items may not be scanned properly or blind spots can be created, which may affect the ability of the self-checkout system 100 to perform loss prevention techniques. The computing system 168 of the self-checkout system 100 can be used to implement the system readiness scheme. The computing system 168 can include one or more processors and one or more memory devices that store a program, which, when executed, causes the one or more processors to, individually or collectively, perform an operation, e.g., a system readiness operation to detect and address impact events.

Figure 5:
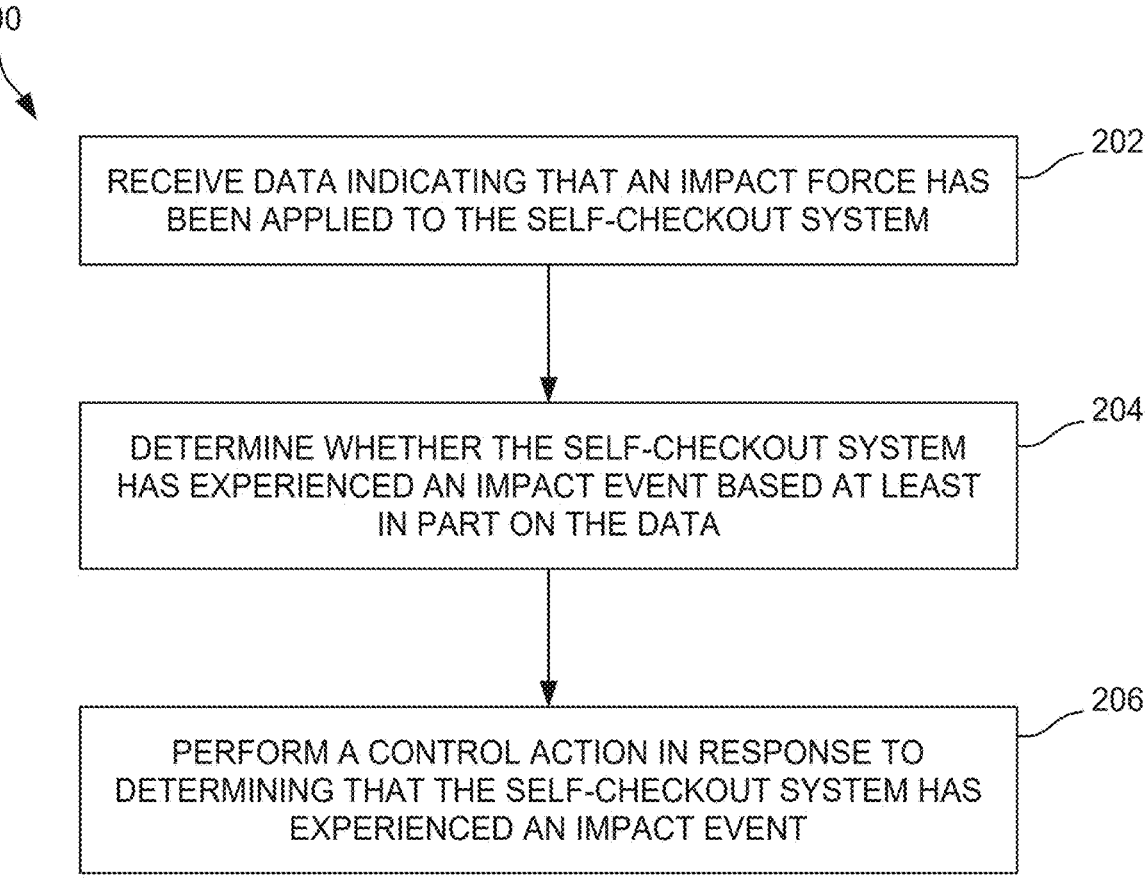
FIG. 5 is a flow diagram for implementing a system readiness operation for detecting and addressing an impact event to a self-checkout system, according to one or more aspects of the present disclosure.

With reference now to FIGS. FIGS. 1, 2, 3, 4 and 5, the system readiness operation to detect and address impact events can be implemented by the self-checkout system 100 according to the process 200 depicted in the flow diagram of FIG. 5.

At 202, in performing the operation, the one or more processors can receive data indicating that an impact force has been applied to the self-checkout system 100. An impact force to the self-checkout system 100 can be caused in a number of ways, such as by a shopping cart striking the tower 118 or one of the shelves, as noted above.

In one or more examples, the display screen 128 has an accelerometer 184, e.g., for determining whether the display screen 128 is in a portrait or landscape mode so that images can be displayed on the display screen 128 accordingly. In such examples, the accelerometer 184 can also be used to detect impact forces applied to the self-checkout system 100, including the magnitude and direction of the impact force. Accordingly, the data indicating that an impact force has been applied to the self-checkout system 100 can be received from the accelerometer 184.

In one or more other examples, the data indicating that an impact force has been applied to the self-checkout system 100 can include one or more current images captured by one or more cameras of the self-checkout system 100, such as the camera 136, the cameras 150, 152, the camera 166, or some combination thereof. For instance, the one or more cameras can capture images at a predetermined interval, when the accelerometer 184 indicates that an impact force has been applied to the self-checkout system 100, when a field of view of one or more of the cameras is out of range with respect to a baseline field of view, or based on some other condition. Accordingly, the data indicating that an impact force has been applied to the self-checkout system 100 can be received from one or more cameras of the self-checkout system 100, or even potentially offboard cameras, such as cameras of a retail store in which the self-checkout system 100 is positioned.

At 204, in performing the operation, the one or more processors can determine whether the self-checkout system has experienced an impact event based at least in part on the data.

In one or more examples, the data indicating that an impact force has been applied to the self-checkout system can include current images 190 captured by one or more cameras of the self-checkout system 100. In such examples, in determining whether the self-checkout system 100 has experienced an impact event based at least in part on the data, the one or more processors can compare the one or more current images 190 with one or more baseline images 176. The one or more processors can determine that the self-checkout system 100 has experienced the impact event when the current image 190 captured by the one or more cameras does not correspond (e.g., match or substantially match according to a predetermined percentage) with the baseline image 176.

In one or more examples, in determining whether the self-checkout system 100 has experienced an impact event based at least in part on the data, the one or more processors can determine whether a current field of view of the camera 136 mounted to a lane status pole 132 is out of range with respect to a baseline field of view of the camera 136. The one or more processors can determine that the self-checkout system has experienced the impact event when the current field of view of the camera 136 is out of range with respect to the baseline field of view.

In one or more examples, in determining whether the self-checkout system 100 has experienced an impact event based at least in part on the data, the one or more processors can determine whether the impact force has achieved an impact threshold. The one or more processors can determine that the self-checkout system 100 has experienced the impact event when the impact force has achieved the impact threshold, e.g., that the impact force has reached or exceeded the impact threshold. The impact threshold can be set at a predetermined force level, e.g., that is greater than forces experienced by the self-checkout system 100 with normal use.

In one or more examples, after determining that the self-checkout system 100 has experienced the impact event when the impact force has achieved the impact threshold, the one or more processors can perform a visual confirmation process by comparing one or more current images 190 captured by one or more cameras of the self-checkout system 100 with one or more baseline images 176. The baseline images 176 can represent the self-checkout system 100 in a readiness state, or rather, in a state in which the self-checkout system 100 is ready for use in a normal mode without any damage thereto and the cameras and sensors calibrated for producing accurate measurements. Further, the one or more processors can detect whether the self-checkout system 100 has an abnormality based at least in part on the comparison between the current image 190 captured by the one or more cameras and the baseline image 176. For instance, if the impact event has caused the input shelf 138 to become broken or otherwise damaged, this abnormality can be detected by the one or more processors by comparing the captured current image 190 with the baseline image 176, e.g., by executing a machine-learned model (e.g., a convolutional neural network (CNN)). The one or more processors can confirm the impact event when the self-checkout system 100 upon detection of the abnormality. In at least one example, the one or more processors can perform a control action in response to confirmation of the impact event, and not before.

At 206, in performing the operation, the one or more processors can perform a control action in response to determining that the self-checkout system 100 has experienced the impact event.

In one or more examples, the control action can include physically blocking access to the self-checkout system 100. In at least one example, performing the control action can include moving a lane blocker 186 to physically close off the self-checkout system 100. The lane blocker 186 can be coupled with the input shelf 138 mounted to the tower 118, for example. In at least one example, the lane blocker 186 can include a pole or bar coupled with an actuator (e.g., an electrically-controlled actuator). The actuator can be controlled to selectively move the pole or bar outward from the input shelf 138, e.g., along the X-direction, and inward toward the input shelf 138, e.g., along the X-direction. In this regard, the lane blocker 186, or pole or bar thereof, can be movable between a retracted position and a deployed position in which the lane blocker 186 physically closes off the self-checkout system 100. In the retracted position, the lane blocker 186 can allow physical access to the self-checkout system 100, and can be retracted so as to be hidden from sight. For instance, the pole or bar can be retracted within a recess defined by the input shelf 138 or arranged underneath, e.g., as shown in FIG. 1.

When an impact event occurs, one or more components of the self-checkout system 100 can become broken, cracked, or otherwise damaged. Accordingly, the lane blocker 186 can be selectively deployed to prevent or urge users not to move in close proximity to the self-checkout system 100. In other examples, the lane blocker 186 can be arranged in a remote location with respect to the tower 118 and shelves, such as at an entrance of a lane or waiting area associated with the self-checkout system 100. In yet other examples, additionally or alternatively to a lane blocker coupled with the input shelf 138, the self-checkout system 100 can include a lane blocker coupled with the output shelf 140.

In some instances, the lane blocker 186 can be deployed upon confirming that a user is not present at the self-checkout system 100, e.g., so as not to strike the user with the lane blocker 186. In at least one example, the computing system 168 can place movement of the lane blocker 186 on "hold" until after a user as exited the area. In at least one example, a speaker of the self-checkout system 100 can produce a sound to warn users that the lane blocker 186 is being deployed or about to be deployed, which can increase safety. In at least one example, the lane blocker 186 can be deployed based on the magnitude of the impact force. For instance, the lane blocker 186 can be deployed upon determining that the impact force has achieved an extreme impact threshold, which is at a greater force level than the impact threshold that can be used to determine whether an impact event occurred. The extreme impact threshold can correspond to a force level at which it is probable (e.g., greater than a fifty percent (50%) chance) that some component of the self-checkout system 100 is broken or otherwise damaged.

In one or more examples, additionally or alternatively to any of the control actions noted above or below, the control action can include switching the self-checkout system 100 from a normal mode to some other mode, such as a shutdown mode or a standby mode. In at least one example, performing the control action can include changing the self-checkout system from a normal mode to a standby mode in which functionality of the self-checkout system is reduced compared to the normal mode, but is yet still operational. For instance, in the standby mode, the self-checkout system 100 can allow for a user to continue scanning items for purchase, but may put a hold on allowing the user to finish payment, to keep the user at the self-checkout system 100 so that an operator may inspect the self-checkout system 100 before the user leaves. In at least one example, performing the control action can include changing the self-checkout system from a normal mode to a shutdown mode in which functionality of the self-checkout system is turned off.

In at least one example, the self-checkout system 100 is switched from the normal mode to the either the standby mode or the shutdown mode based on the magnitude of the impact force. For instance, when the impact force is in a first range, the self-checkout system 100 can be switched from the normal mode to the standby mode, and when the impact force is in a second range, the self-checkout system 100 can be switched from the normal mode to the shutdown mode. The first range can be associated with lower force values than the second range.

In one or more examples, additionally or alternatively to any of the control actions noted above or below, the control action can include automatically initiating a load cell recalibration for a load cell of the item scanner 126 of the self-checkout system 100. As noted above, as a result of the self-checkout system 100 being subjected to an impact event, the load cell of the item scanner 126 can lose accuracy, which can affect how the load cell measures the weight of items. Accordingly, a recalibration of the load cell or load cells of the item scanner 126 can be executed. In at least one example, during the recalibration process, the self-checkout system 100 can switch to a mode of operation that prevents a user from scanning items that are priced by weight. In such an example, the self-checkout system 100 can switch to a mode of operation (e.g., the normal mode) that allows a user to scan items that are priced by weight when the recalibration process has completed successfully.

In one or more examples, additionally or alternatively to any of the control actions noted above, the control action can include automatically communicating to an operator that that the self-checkout system has experienced the impact event. The communication provided to the operator can be an audible communication (e.g., output by a speaker of the self-checkout system 100), a light signal (e.g., the lane light 134 can flash a certain color and/or at a predetermined frequency), a digital signal (e.g., sent to an operator's system), a combination thereof, etc.

System Readiness Check

In some cases, the self-checkout system 100 can experience a predefined event, such as, without limitation, a spill on the floor or on the self-checkout system 100, one or more components of the self-checkout system 100 can become damaged, a user may leave behind one or more items (e.g., purchased items, keys, phone, etc.), the field of view of one or more cameras can drift out of alignment, etc. In one or more examples, the self-checkout system 100 can be arranged to implement a system readiness check to detect and address a predefined event. In at least one example, the self-checkout system 100 can implement a system readiness check periodically according to a time interval, e.g., every ten (10) minutes. In at least one other example, the self-checkout system 100 can perform a system readiness check based on the occurrence of one or more conditions, such as after each user transaction. The computing system 168 of the self-checkout system 100 can be used to implement the system readiness check. The computing system 168 of the self-checkout system 100 can include one or more processors and one or more memory devices that store a program, which, when executed, causes the one or more processors to, individually or collectively, perform an operation, e.g., a system readiness check operation.

With reference now to FIGS. FIGS. 1, 2, 3, 4 and 6, the system readiness operation to detect and address impact events can be implemented by the self-checkout system 100 according to the process 300 depicted in the flow diagram of FIG. 6.

In one or more examples, baseline images 176 of the self-checkout system 100 can be captured for respective predefined sets of environmental conditions 177. For instance, as shown in FIG. 4, a first baseline image B1 can be captured for a first set of environmental conditions EC1, a second baseline image B2 can be captured for a second set of environmental conditions EC2, a third baseline image B3 can be captured for a third set of environmental conditions EC3, and so on. The baseline images 176 can represent the self-checkout system 100 in a readiness state, or rather, in a state in which the self-checkout system 100 is ready for use in a normal mode without any damage, spills, etc. affecting the self-checkout system 100 for a given predefined set of environmental conditions. Moreover, each of the baseline images 176 can depict at least one of the housing 114, the display screen 128, the input and output shelves 138, 140, and/or the counter 122. The baseline images 176 can be captured by the one or more cameras 136, 150, 152, 166 during their respective predefined sets of environmental conditions 177. Accordingly, the library 175 can be constructed and stored in one or more memory devices, with the library 175 corresponding baseline images 176 with predefined sets of environmental conditions 177.

In one or more examples, a plurality of baseline images 176 can be associated with a given predefined set of environmental conditions 177. For instance, the plurality of baseline images 176 associated with a given predefined set of environmental conditions 177 can include an image of the housing 114, an image of the display screen 128, an image of the input and output shelves 138, 140, and an image of the counter 122. In at least one example, the plurality of images associated with a given predefined set of environmental conditions can be stitched together according to a predefined format.

In at least one example, the predefined sets of environmental conditions 177 can each define an environmental setting associated with the self-checkout system 100 at a given time and location of the self-checkout system 100. The environmental conditions in a predefined set can include, without limitation, a time of day, a time of year, outdoor weather conditions (e.g., sunny, cloudy, precipitation, etc.), a lumen level indoors, or some combination thereof. One or more of these environmental conditions can affect how the one or more cameras 136, 150, 152, 166 capture images of the self-checkout system 100 and its surroundings. Hence, the self-checkout system 100 can advantageously account for these affects by capturing a plurality of baseline images for respective sets of predefined environmental conditions. By comparing baseline images 176 with current images 190 captured in the same or similar environmental conditions, the accuracy of detecting predefined events can be increased, as will be explained more fully below.

At 302, in performing the system readiness check operation, the one or more processors can receive a current set of environmental conditions. In at least one example, the current set of environmental conditions can include at least one of: a time of day, a time of year, outdoor weather conditions, or a lumen level indoors. As noted above, one or more of these environmental conditions can affect image capture of the self-checkout system 100 and its surroundings. The current set of environmental conditions can be generated, or provided by, an environmental condition generator 188, which can receive information relating to the time of day, the time of year, the outdoor weather conditions (e.g., whether it is sunny, cloudy, raining, snowing, etc.), and the lumen level or brightness provided by interior lighting in the building in which the self-checkout system 100 is arranged. The environmental condition generator 188 can include an internal clock, an interface for connecting with a weather forecaster, and/or one or more sensors for detecting lumen intensity and/or interface for connecting with a system arranged to provide the current lumen level.

At 304, in performing the system readiness check operation, the one or more processors can select a baseline image from a plurality of baselines images 176. For instance, the baseline image can be selected from the library 175. The selected baseline image can be associated with a predefined set of environmental conditions that matches or best matches the current set of environmental conditions. Accordingly, the current set of environmental conditions can be compared to the predefined sets of environmental conditions within the library 175, and when a closest match or match is determined, the baseline image associated with the predefined set of environment conditions can be selected. As noted above, the plurality predefined sets of environmental conditions are associated with respective ones of the plurality of baseline images. The selected baseline image can depict at least one of the housing 114, the display screen 128, the input and output shelves 138, 140, or the counter 122. The baseline image can be captured by the one or more cameras 136, 150, 152, 166 during the predefined set of environmental conditions at a previous time.

At 306, in performing the system readiness check operation, the one or more processors can receive a current image 190 of the self-checkout system 100. The current image 190 can depict at least one of the housing 114, the display screen 128, the input and output shelves 138, 140, or the counter 122. The current image 190 can be captured by the one or more cameras 136, 150, 152, 166 during the current set of environmental conditions at a current time.

At 308, in performing the system readiness check operation, the one or more processors can determine whether the self-checkout system has experienced a predefined event by comparing the current image 190 of the self-checkout system with the selected baseline image 176. As one example, the current image 190 can be a stitched image formed from a plurality of images, and the stitched image can depict the housing 114, the display screen 128, the input and output shelves 138, 140, and the counter 122, according to a predefined format. The selected baseline image 176 can likewise be a stitched image formed from a plurality of images, and the stitched baseline image can depict the housing 114, the display screen 128, the input and output shelves 138, 140, and the counter 122, according to the predefined format.

In performing the image comparison, which can be implemented by executing one or more computer vision algorithms or a machine-learned model (e.g., a CNN), one or more abnormalities can be detected by the one or more processors. As a first example, the current image 190 can show that milk or another liquid has spilled on the counter 122, and as the baseline image 176 does not show this spill, the liquid spill on the counter 122 can be identified as an abnormality, and based on one or more image recognition techniques, the spill can be classified as a counter spill event, which can be one of the predefined events. As a second example, the current image 190 can show that a user has left the self-checkout system 100 after completing a transaction but yet has left their keys on the output shelf 140. The baseline image 176 does not show the keys on the output shelf 140, and thus, the keys left on the output shelf 140 can be identified as an abnormality, and based on one or more image recognition techniques, the keys left on the output shelf 140 can be classified as a "left item" event, which can be one of the predefined events. The one or more processors can proceed with performing a control action upon detection of an abnormality and/or upon classification of the predefined event.

At 310, in performing the system readiness check operation, the one or more processors can perform a control action in response to determining that the self-checkout system 100 has experienced a predefined event.

Continuing with the first example noted above, with the self-checkout system 100 experiencing the counter spill event, a control action can be performed to address the spill. As one example, when the spill is relatively major (e.g., the liquid is all over the item scanner 126 and dripping onto the floor), the control action can include moving a lane blocker to physically close off the self-checkout system 100, e.g., after the current user finishes the transaction and leaves the self-checkout system 100. This can prevent subsequent users from utilizing the self-checkout system 100, e.g., until the spill has been addressed, which can facilitate user safety. As another example, when the spill is relatively minor (e.g., a small amount of liquid is present on the counter 122), the control action can include automatically communicating to an operator (e.g., a sales associate) that that the self-checkout system 100 has experienced a spill event, and that assistance is needed. The control action can also include automatically communicating to an operator that that the self-checkout system 100 has experienced a spill event, and that assistance is needed, when the spill is relatively major.

Continuing with the second example noted above, with the self-checkout system 100 experiencing the "left item" event, a control action can be performed to address the left item. As one example, the control action can include automatically communicating to an operator (e.g., a sales associate) that that the self-checkout system 100 has experienced a "left item" event, and that assistance is needed. This can allow the operator to collect the left item. In addition, in at least one example, the communication can include a captured image of the user who has left the item on the output shelf 140. The captured image can be taken by the one or more cameras 136, 150, 152, 166 of the self-checkout system 100. In this way, the operator will be able to better pair the user with the left item. Further, in at least one example, the control action can include communicating directly with the user who has left the item, e.g., by text, phone call, email, a combination thereof, etc. The self-checkout system 100 can recognize the user, e.g., by captured biometric data, by payment information, etc., and can utilize the phone number or email on record to communicate with the user. This communication can occur in real time or near real time so that the user can receive the message and immediately return for the left item.

In one or more other examples, performing the control action can include changing the self-checkout system from a normal mode to a standby mode in which functionality of the self-checkout system is reduced compared to the normal mode, (e.g., when it is recognized that there is minor damage to the self-checkout system 100) or to a shutdown mode in which functionality of the self-checkout system is shut off (e.g., when it is recognized that there is substantial damage to the self-checkout system 100).

In one or more other examples, performing the control action can include automatically performing recalibration of the load cell 148 of the item scanner, such as when the predefined event is a damage event associated with the counter 122 or item scanner 126 disposed thereon. In one or more further examples, any combination of the control actions noted above can be performed in response to the detection and classification of the predefined event.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to the described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not an advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the described embodiments may take the form of an entirely hardware embodiment, an entirely software embodiment (including firmware, resident software, microcode, etc.) or an embodiment combining software and hardware aspects that may generally be referred to herein as a "circuit," "module" or "system."

One or more of the described embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the described embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the described embodiments.

Aspects of the described embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a described manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to one or more embodiments, other and further embodiments may be devised without departing from the basic scope thereof, and the scope thereof is determined by the claims that follow.

What is claimed is:

1. A self-checkout system, comprising:
a housing comprising a base support,
a tower extending vertically upwards from the base support, wherein the tower comprises a first side, a second side, and a third front side,
a back panel coupled with the tower and extending vertically upwards relative to the tower;
a display screen mounted to the back panel;
a counter mounted at the third front side of the tower, wherein the counter comprises a counter support portion arranged beneath the counter and mounted at the third front side of the tower;
an input shelf mounted to the first side of the tower at a first corner of the tower;
an output shelf mounted to the second side of the tower at a second corner of the tower, wherein the output shelf comprises a horizontal curved portion extending orthogonally relative to the base support;
a vertical support member mounted at the third front side of the tower extending between a top surface of the input shelf with a bottom surface of the counter and positioned to couple the input shelf and the counter support portion;
and
a computing system having one or more processors and one or more memory devices storing a program, which, when executed, causes the one or more processors to, individually or collectively, perform an operation, comprising:
receiving data indicating that an impact force has been applied to the self-checkout system;
determining that the self-checkout system has experienced an impact event based at least in part on the data; and
performing a control action in response to determining that the self-checkout system has experienced the impact event.

2. The self-checkout system of claim 1, wherein, in determining that the self-checkout system has experienced an impact event based at least in part on the data, the operation comprises:
determining whether the impact force has achieved an impact threshold; and
determining that the self-checkout system has experienced the impact event when the impact force has achieved the impact threshold.

3. The self-checkout system of claim 2, wherein the display screen has an accelerometer, and wherein the data indicating that the impact force has been applied to the self-checkout system is received from the accelerometer.

4. The self-checkout system of claim 2, wherein, responsive to determining that the self-checkout system has experienced the impact event when the impact force has achieved the impact threshold, the operation comprises:
performing a visual confirmation process by comparing a current image captured by one or more cameras of the self-checkout system with a baseline image of the self-checkout system;
detecting whether the self-checkout system has an abnormality based at least in part on the comparing between the current image and the baseline image; and
confirming the impact event when the self-checkout system has the abnormality, and
wherein the control action is performed in response to confirmation of the impact event.

5. The self-checkout system of claim 1, wherein the data indicating that an impact force has been applied to the self-checkout system comprises a current image captured by one or more cameras of the self-checkout system, and wherein, in determining whether the self-checkout system has experienced an impact event based at least in part on the data, the operation comprises:
comparing the current image captured by the one or more cameras with a baseline image, and
determining that the self-checkout system has experienced the impact event when the current image does not correspond with the baseline image.

6. The self-checkout system of claim 1, wherein, in determining whether the self-checkout system has experienced an impact event based at least in part on the data, the operation comprises:
determining whether a current field of view of a camera mounted to a lane status pole is out of range with respect to a baseline field of view of the camera; and
determining that the self-checkout system has experienced the impact event when the current field of view of the camera is out of range with respect to the baseline field of view.

7. The self-checkout system of claim 1, wherein performing the control action comprises moving a lane blocker to physically close off the self-checkout system.

8. The self-checkout system of claim 7, wherein the lane blocker is coupled with an input shelf mounted to the tower and is movable between a retracted position and a deployed position in which the lane blocker physically closes off the self-checkout system.

9. The self-checkout system of claim 1, wherein performing the control action comprises changing the self-checkout system from a normal mode to a standby mode in which functionality of the self-checkout system is reduced compared to the normal mode or to a shutdown mode in which functionality of the self-checkout system is shut off.

10. The self-checkout system of claim 9, wherein the self-checkout system is changed to the standby mode or to the shutdown mode based at least in part on a magnitude of the impact force.

11. The self-checkout system of claim 1, further comprising:
an item scanner having a load cell, and
wherein performing the control action comprises automatically performing recalibration of the load cell of the item scanner.

12. The self-checkout system of claim 11, wherein, during recalibration of the load cell, performing the control action further comprises changing a mode of operation of the self-checkout system that prevents a user from scanning items that are priced by weight.

13. The self-checkout system of claim 1, wherein performing the control action comprises automatically communicating to an operator that that the self-checkout system has experienced the impact event.

14. The self-checkout system of claim 1, wherein the input shelf and the output shelf are mounted to opposing corners of the tower.

15. A self-checkout system, comprising:
a housing comprising a base support,
a tower extending vertically upwards from the base support, wherein the tower comprises a first side, a second side, and a third front side,
a back panel coupled with the tower and extending vertically upwards relative to the tower;
a display screen mounted to the back panel;
a counter mounted at the third front side of the tower, wherein the counter comprises a counter support portion arranged beneath the counter and mounted at the third front side of the tower;
an input shelf mounted to the first side of the tower at a first corner of the tower;
an output shelf mounted to the second side of the tower at a second corner of the tower, wherein the output shelf comprises a horizontal curved portion extending orthogonally relative to the base support;
a vertical support member mounted at the third front side of the tower extending between a top surface of the input shelf with a bottom surface of the counter and positioned to couple the input shelf and the counter support portion;
and
a computing system having one or more processors and one or more memory devices storing a program, which, when executed, causes the one or more processors to, individually or collectively, perform a system readiness check operation, comprising:
receiving a current set of environmental conditions;
selecting a baseline image from a plurality of baseline images, the selected baseline image being associated with a predefined set of environmental conditions that matches or best matches the current set of environmental conditions, the predefined set of environmental conditions being one of a plurality predefined sets of environmental conditions each associated with respective ones of the plurality of baseline images,
wherein the baseline image depicts at least one of the housing, the display screen, the input and output shelves, or the counter, the baseline image is captured by the one or more cameras during the predefined set of environmental conditions;
receiving a current image of the self-checkout system, the current image depicts at least one of the housing, the display screen, the input and output shelves, or the counter, the current image is captured by the one or more cameras during the current set of environmental conditions;
determining that the self-checkout system has experienced a predefined event by comparing the current image with the selected baseline image; and
performing a control action after determining that the self-checkout system has experienced a predefined event.

16. The self-checkout system of claim 15, wherein the current and predefined sets of environmental conditions include at least one of: a time of day, a time of year, or outdoor weather conditions, or a lumen level indoors.

17. The self-checkout system of claim 15, wherein performing the control action comprises at least one of:
changing the self-checkout system from a normal mode to a standby mode in which functionality of the self-checkout system is reduced compared to the normal mode or to a shutdown mode in which functionality of the self-checkout system is shut off;
moving a lane blocker to physically close off the self-checkout system; or
automatically performing recalibration of a load cell of an item scanner.

18. The self-checkout system of claim 15, wherein the system readiness check operation is performed after each user transaction takes place.

* * * * *